Nov. 29, 1966   E. E. ROTH ETAL   3,288,269
CASE STACKING CONVEYOR SYSTEM
Filed May 17, 1965   2 Sheets-Sheet 2
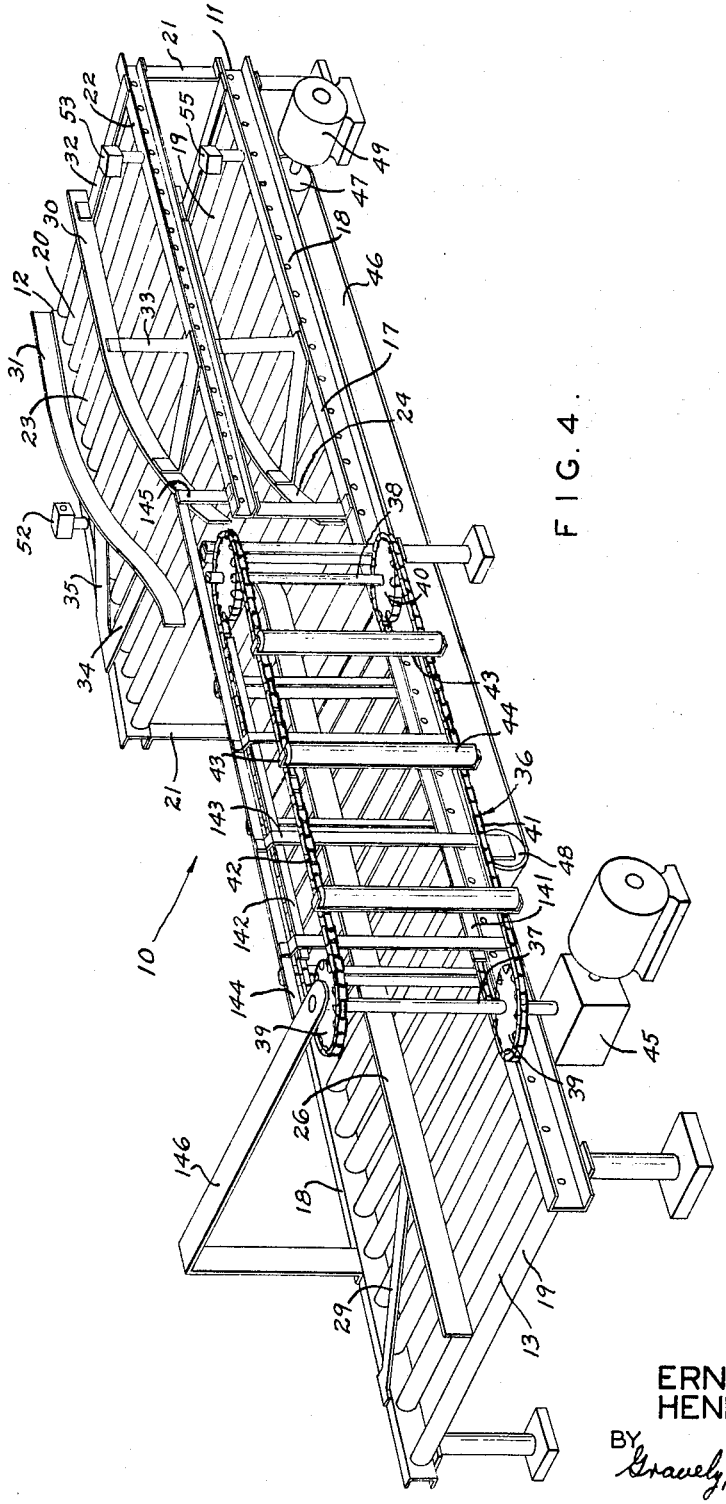
F I G. 4.
INVENTORS
ERNEST E. ROTH
HENRY E. TANNER
BY
Gravely, Lieder & Woodruff
ATTORNEYS

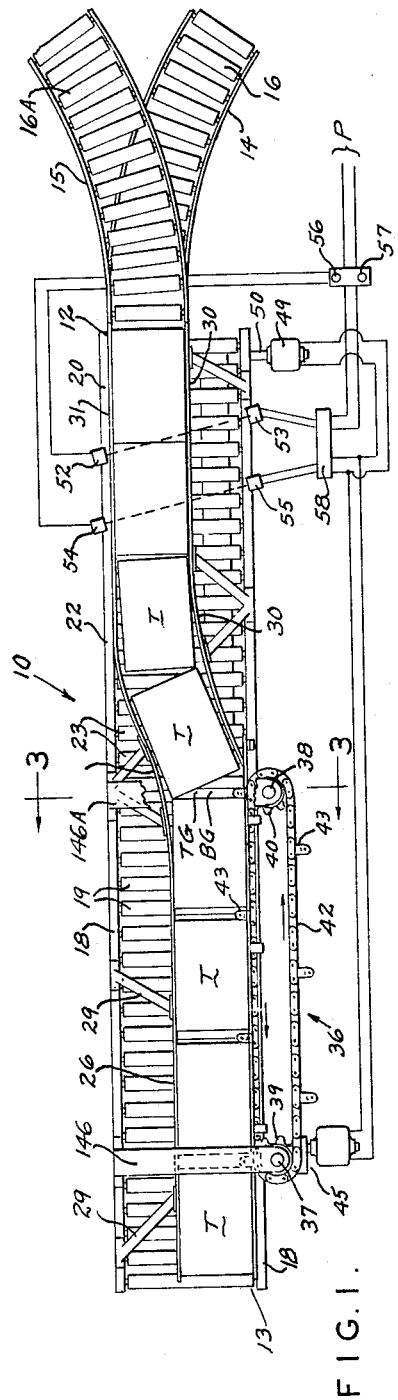
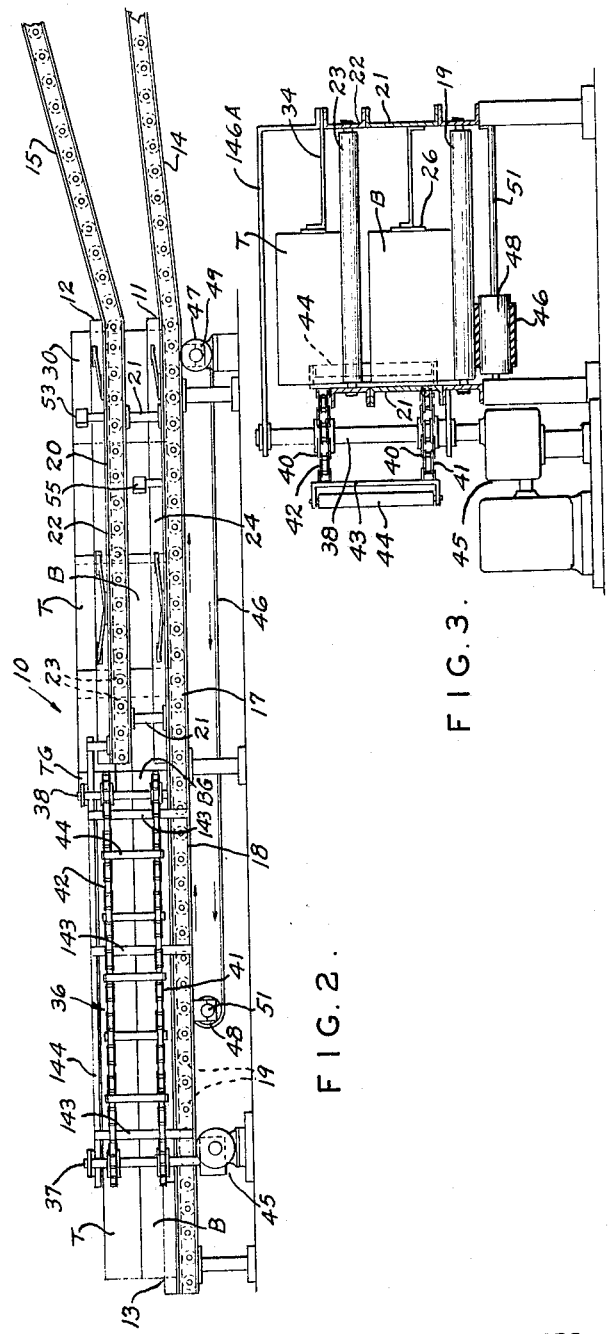

United States Patent Office 3,288,269
Patented Nov. 29, 1966

3,288,269
CASE STACKING CONVEYOR SYSTEM
Ernest E. Roth, Arnold, and Henry E. Tanner, Affton, Mo., assignors to Alvey Conveyor Manufacturing Company, St. Louis, Mo., a corporation of Missouri
Filed May 17, 1965, Ser. No. 456,167
7 Claims. (Cl. 198—35)

This invention relates to conveyor systems for stacking cases from a plurality of feed conveyors, and is particularly directed to the combining of cases into pre-stacked tiers.

The mass handling of articles, cartons, cases or the like by conventional apparatus has been largely predicated upon the concept that such articles have to be moved or conveyed in single tiers to a machine where the articles are then stacked in tiers and placed on pallets for group handling. This concept, of course, has required special stacking machines which complicates the rapid handling procedures and restricts the number of articles or cases that can be moved in a given time. The complications are increased when cases are to be moved into storage racks for subsequent handling. The mass handling of case goods, such as bottled or canned foods, case goods and breakfast foods, are examples of cases normally handled by conveyor systems which feed the cases into pallet loading machines. The loaded pallets are then deposited in trucks for immediate distribution or the pallets are moved into storage racks to await distribution.

The present invention has as a principal object the provision of a conveyor system to increase the rapidity with which cases may be handled and to reduce the handling time required in present day operations.

This invention also has as an important object the provision of a conveyor system suitable for receiving cases from two or more conveyor feeding lines and combining such cases directly into stacks or tiers without the need for special stacking apparatus.

It is also an object of this invention to provide a conveyor system that will receive cases from a plurality of conventional conveyor lines, bring the cases into registration for subsequent stacking, and discharge the stacked cases all without interruption in the flow thereof.

A further object of the present invention is to provide a gravity roller conveyor with means to arrange cases from two or more conveyor lines into vertically aligned registration and to positively move the cases rapidly into stacked relationship without rough treatment.

Still another object of the invention is to provide a case stacking conveyor system with a simple and positive powered registration conveyor that will also serve to move the stacked cases to a point of discharge.

The invention is exemplified in one embodiment by a conveyor system that includes a plurality of roller-type conveyor feed lines arranged in layered position to handle the cases to be stacked, a roller conveyor stacking unit connected to the feed lines, case stack registration means of power operated character to vertically align the stacked cases, and control means to govern the power operated registration so that the failure of a full supply of cases from each feed line will stop the operation of the stacking registration means and prevent damage to the contents of the cases.

The embodiment chosen for illustration includes two case feeding conveyors, but more than two feeding conveyors can be combined without difficulty once the principle of the invention is understood and appreciated.

Other embodiments of the present invention, together with attendant advantages, will be apparent from the following description when taken in conjunction with the accompanying drawings, wherein:

FIG. 1 is a plan view of so much of a conveyor system necessary to disclose the principles of the present invention;

FIG. 2 is a side elevational view of the conveyor system shown in FIG. 1;

FIG. 3 is a transverse sectional view taken at line 3—3 in FIG. 1 showing certain details of the assembly that have been omitted from the schematic view so as not to obscure the plan view; and FIG. 4 is a schematic perspective view of the conveyor system to further illustrate the invention.

In the following description of the case stacking conveyor system, it is to be understood that the term "case" shall refer to any of the presently available transport containers, boxes, or cartons for bottle, can, or pre-packaged goods that move in the channels of commerce. It is also to be understood that in disclosing the selected embodiments of the conveyor, certain details have been omitted so as to simplify the drawings, since such would normally be more or less conventional.

With reference to FIGS. 1 and 2, the conveyor system comprises a case stacking unit 10 having a pair of case receiving ends 11 and 12 and a stacked case discharge end 13. The case receiving end 11 is associated with an inclined feed conveyor 14 that delivers a line of cases from a source not shown. Similarly, the end 12 is associated with another inclined feed conveyor 15 to deliver similar cases from a source not shown. The conveyors 14 and 15 are provided with rollers 16 and 16a, respectively, for supporting and promiting the flow of cases.

Considering first the flow of cases from feed conveyor 14, it is observed that the stacking unit 10 is provided with a bottom or lower conveyor 17 having side rails 18 to support a plurality of rollers 19 forming a bottom roller bed extending horizontally. The cases from the inclined feed conveyor 14 run off onto the rollers 19 and move leftwardly as seen in FIG. 2. The bottom run of cases are indicated at B. Similarly, an upper conveyor 20 is supported by brackets 21 which extend upwardly from each of the side rails 18 to engage the side rails 22 of conveyor 20 and retain the latter in horizontal relation. A series of rollers 23 supported between the side rails 22 forms a top roller bed for a run of top cases T. The cases T are delivered to the top roller bed from the inclined conveyor 15 in a flow that moves leftwardly as seen in FIG. 2.

In FIGS. 2 and 4, it can be seen that the cases from feed conveyor 14 pass between fixed side guides 24 and 25 associated with the bottom conveyor 17. The cases are formed into a line having a curvature that breaks the end-to-end abutment thereof and forms a final gap BG (see FIGS. 1 and 2) just before the cases B straighten out and form a line alongside a final guide 26 on the conveyor 17. The guide 26 is held in position by brackets 29 secured to the nearest side rail 18. The top line of cases T from feed conveyor 15 run onto the conveyor rollers 23 of conveyor 20 and pass between side guides 30 and 31 having a curvature which is substantially similar to the guides 24 and 25 (FIGS. 1 and 4). These guides are supported by brackets 32, 33, 34 and 35 in FIG. 4. In this manner the line of cases T are formed into a run directly over the line of cases B so that the two lines of cases B and T are vertically registered in the conveyor unit 10, and the cases on the upper conveyor descend into stacked relation on the cases on the lower conveyor. It can be seen that the cases T are caused to break and form a final gap TG (see FIGS. 1 and 2) just before they straighten out in a line on conveyor 17 over the bottom cases B.

As shown in FIGS. 1, 3 and 4, the conveyor unit 10 is provided with a case stack registration device 36 comprising vertically spaced shafts 37 and 38 mounted in suitable bearing brackets (not particularly shown in any views of the drawing) that are carried by the side rails 18 on the bottom conveyor 17 and the side rail 22 on the upper conveyor 20. The shafts 37 and 38 carry a pair of sprockets 39 and 40, respectively, over which are trained lower and upper sprocket chains 41 and 42, respectively. Each of the upper and lower chains has certain of its links modified to support a number of horizontally spaced brackets 43 that carry rollers 44 in vertical positions. It is seen that the brackets 43 and rollers 44 are spaced along the chaiins 41 and 42.

It can be seen in FIGS. 1 and 4 that the chains 41 and 42 are backed-up on the case registering run by horizontal members 141 and 142, and the horizontal members are carried by vertical supports 143. The bottom ends of supports 143 are attached to the adjacent conveyor side rail 18, and the upper ends are attached to a horizontal bar 144. One end of the bar 144 is supported by a member 145, the opposite end being suitably supported (not shown) by the angle member 146 used to carry the upper bearing on the shaft 37.

The device 36 is driven in a counterclockwise direction (FIG. 1) by motor means and gear box 45 which, in turn, drives the shaft 37. The movement of the device 36 brings each roller 44, or stack registering element, in succession into the gap spaces BG and TG between the cases B and T and positively aligns the cases so that as the top cases T run off the rollers 23 each drops directly onto a corresponding bottom case B, as seen in FIG. 2. The rollers 44, therefore, cause the cases to move into vertically stacked alignment and also help drive the stacked cases along the bottom conveyor bed to the discharge end 13 for subsequent disposition.

In the embodiment illustrated, the top conveyor 20 is preferably set close to the bottom conveyor 17 so that the movement of cases B is not obstructed but the vertical drop of cases T is decreased as far as possible. In operation the cases T will tilt downwardly as each one leaves conveyor rollers 23 so that the drop is cushioned somewhat by the manner in which the top cases T progressively tilt onto the bottom cases B, and by the forward sliding of the top cases T through the engagement therewith of the registration rollers 44.

The gravity feed of cases from the conveyor 15 onto upper conveyor 20 is usually sufficient to carry the cases the full length of conveyor 20 and also force the cases to follow the curved direction of guides 30 and 31. However, as the cases stack together on conveyor 17, the load on the rollers 19 may impede the free progress of the cases between the feed conveyor 14 and the end of guides 24 and 25. This impedance is overcome by mounting a roller drive belt (FIG. 2) 46 between the driven pulley 47 and the idler pulley 48. In FIG. 3, the belt 46 has its upper run engaged against rollers 19 so as to drive the same in a direction to move cases B leftwardly, and motor means 49 is connected to the pulley 47 through its shaft 50. A shaft 51 supports pulley 48 from the side rails 18. It is observed that the belt 46 and the device 36 are to be operated at substantially the same linear speed so that one does not either overrun or cause a drag on the other, whereby the cases B and T are brought together in a substantially synchronous movement.

To assure the presence of bottom cases B on conveyor 17 to receive and support top cases T leaving conveyor 20, and further to assure the presence of cases T so that each stack will be complete, the system shown in the drawings is provided with control means that senses the presence or absence of cases B and T. In FIGS. 1 and 4, the upper conveyor 20 has a light source 52 carried on one side rail 22 and the opposite rail 22 carries a photocell unit 53 in position to be activated by the light source 52 when an interruption in the supply of cases T occurs. Similarly, the bottom conveyor 17 has a light source 54 (see FIG. 1) on side rail 18 pointed toward a photocell unit 55 on the opposite rail to activate said unit 55 when there is an interruption in the presence of cases B on the conveyor 17. The current supply from any suitable source P is controlled by a unit having a first switch 56 to supply current to light the light sources 52 and 54. There is a second on-off switch 57 that controls the current supply to a suitable control unit 58. Unit 58 is arranged conventionally to respond to the energization of both photocells 53 and 55 to shut off the current to motors 45 and 49 and stop the system until cases again completely fill both conveyors 17 and 20 and interrupt the light beams to re-establish the current supply to motors 45 and 49.

While a preferred embodiment of the invention has been described above, it is understood that changes and alterations may be made in the multiple conveyors without departing from the spirit or scope of the invention as defined in and by the appended claims.

What is claimed is:

1. A case stacking conveyor system comprising a first conveyor having a case receiving end and a case discharge end connected by an intermediate portion, a second case receiving conveyor spaced above said first conveyor and having a case run-off end over said intermediate portion of said first conveyor, separate supplies of cases on said first and second conveyors, guide means associated with each conveyor to guide said cases thereon into a line in abutting relation, said guide means constraining said cases on each conveyor to move through substantially identical curved paths to cause gaps to form at the same side of the lines of said cases, said cases on said second conveyor on reaching said run-off end descending into stacked relation with cases on said first conveyor, and case stack registering means adjacent said first conveyor including elements movable into the gaps formed between successive cases in each line of cases and positively registering said cases in vertically aligned stacked relation.

2. The case stacking system set forth in claim 1 wherein motor means is connected to said case stack registering means to actuate the same continuously with case movement.

3. The case stacking system set forth in claim 2 wherein powered means is provided to positively actuate said first conveyor for moving cases through said curved path and into position to receive cases descending from said second conveyor.

4. The case stacking system set forth in claim 3 wherein a control circuit is connected to said powered means and said motor means to maintain operation thereof with supply.

5. The case stacking system set forth in claim 2 wherein said stack registering means includes an endless member and a plurality of spaced elements on said member movable into said gaps between successive cases.

6. A case stacking conveyor system comprising a first horizontally elongated conveyor having a case receiving end and a discharge end, a second horizontal conveyor spaced above said first conveyor and being of lesser length, said second conveyor having a case receiving end coinciding with said first conveyor receiving end and a case run-off end over said first conveyor in a zone between the said ends thereof, a supply of cases on each conveyor in abutment to form a continuous line, guide means on each conveyor extending between said receiving ends and said zone coincident with said case run-off end of said second conveyor, said guide means having a curved portion extending into said last mentioned zone to direct each linet of case along a curved path whereby an angular break is formed between adjacent cases on each conveyor, and case registering means adjacent said coincident zone including an element movable into the angular break between adjacent cases and positively align said cases as said cases on said second conveyor pass beyond said run-off end and descend upon cases on said first conveyor.

7. A case stacking conveyor system comprising at least two case conveyor means arranged in vertically layered relation, a supply of cases on each of said conveyor means in abutment to form continuous lines of cases, case guide means on each of said conveyor means to direct the cases through curved paths, the curved paths being vertically spaced and substantially identical, the upper conveyor means having a case discharge terminal end above the lower conveyor means and said terminal end being in said curved path, said cases passing through said curved path being angularly separated to provide gaps that are widest adjacent the outermost margins of the curved paths, and means adjacent said outermost margins of the curved paths to move into successive gaps in the lines of cases on said conveyor means and positively register uppermost cases with lowermost cases and guide the uppermost cases as each leaves said terminal end.

References Cited by the Examiner
UNITED STATES PATENTS 2,815,848  12/1957  Jones _____ 198—35

EVON C. BLUNK, *Primary Examiner.*
E. A. SROKA, *Assistant Examiner.*